United States Patent [19]

Shirane

[11] Patent Number: 5,412,629
[45] Date of Patent: May 2, 1995

[54] METHOD AND APPARATUS FOR RECORDING AND/OR REPRODUCING DATA ON A DISK FORMATTED IN ACCORDANCE WITH A CONSTANT LINEAR VELOCITY (CLV) SYSTEM

[75] Inventor: Kyoichi Shirane, Kanagawa, Japan

[73] Assignee: Sony Corporation, Tokyo, Japan

[21] Appl. No.: 155,799

[22] Filed: Nov. 23, 1993

[30] Foreign Application Priority Data

Nov. 26, 1992 [JP] Japan .................. 4-317223

[51] Int. Cl.⁶ .......................................... G11B 17/22
[52] U.S. Cl. ......................... 369/32; 369/50; 369/54; 369/58
[58] Field of Search ................. 369/32, 54, 33, 58, 369/50, 47, 48, 53, 124, 44.28, 44.26, 44.27, 189; 360/72.1, 72.2, 73.01, 73.03, 10.1; 358/342, 322

[56] References Cited

U.S. PATENT DOCUMENTS

| | | | |
|---|---|---|---|
| 4,660,189 | 4/1987 | Tsukamura et al. | 369/32 |
| 4,757,489 | 7/1988 | Yamagishi | 369/50 |
| 4,789,975 | 12/1988 | Taniyama | 369/50 |
| 5,161,142 | 11/1992 | Okano | 369/50 |
| 5,249,170 | 9/1993 | Yoshimaru et al. | 369/48 |
| 5,265,081 | 11/1993 | Shimizume et al. | 369/48 |
| 5,278,814 | 1/1994 | Deguchi et al. | 369/47 |
| 5,315,571 | 5/1994 | Maeda et al. | 369/50 |

FOREIGN PATENT DOCUMENTS 0158067 10/1985 European Pat. Off. .
0485234 5/1992 European Pat. Off. .

Primary Examiner—Robert J. Pascal
Assistant Examiner—Ali Neyzari
Attorney, Agent, or Firm—William S. Frommer; Alvin Sinderbrand

[57] ABSTRACT

When recording and/or reproducing data on a disk formatted in a constant linear velocity (CLV) system while the disk is rotated and a head is movable for scanning radially successive circular tracks thereon, and a recording and/or reproducing circuit is operable in response to a data transfer clock for causing the head to record and/or reproduce data in the tracks scanned thereby: the disk is virtually divided into a plurality of virtual zones each comprised of a respective plurality of the tracks; the frequency of the data transfer clock is determined in dependence on the one of the virtual zones in which the tracks being scanned are situated at least during the initiation of a recording or reproducing operation, with the frequency determined at the initiation of a recording or reproducing operation being increased step wise for each successive zone considered in the radially outward direction and being maintained substantially constant at least so long as the tracks being scanned are in the one of the zones at which the recording or reproducing operation was initiated; and the angular velocity at which the disk is rotated during the recording or reproducing of data in the tracks within any one of the virtual zones is decreased as successive tracks, considered in the radially outward direction, are scanned during the recording or reproducing operation in which the frequency of the data transfer clock is maintained substantially constant.

38 Claims, 5 Drawing Sheets

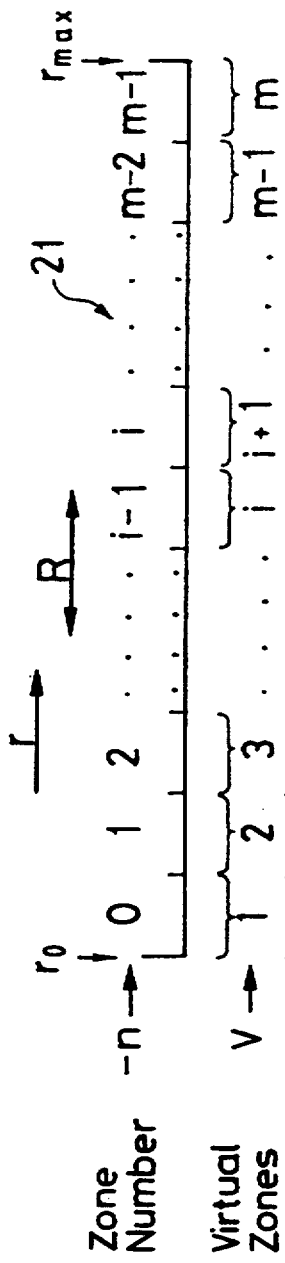
FIG.1A
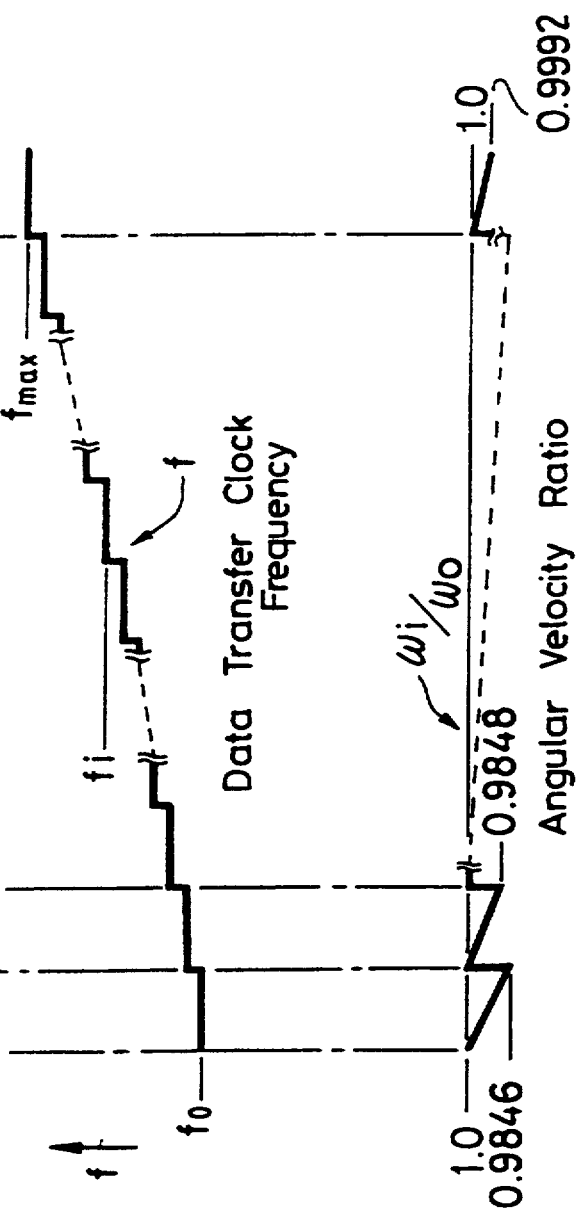
FIG.1B
FIG.1C

METHOD AND APPARATUS FOR RECORDING AND/OR REPRODUCING DATA ON A DISK FORMATTED IN ACCORDANCE WITH A CONSTANT LINEAR VELOCITY (CLV) SYSTEM

BACKGROUND OF THE INVENTION

1. Field of the Invention

This invention relates generally to a method and apparatus for recording and/or reproducing data on a disk formatted in accordance with a constant linear velocity (CLV) system, and more particularly is directed to such method and apparatus suitable for use with a write once optical disk drive.

2. Description of the Prior Art

It is known to employ disks formatted in accordance with constant angular velocity (CAV), constant linear velocity (CLV) and modified constant angular velocity (MCAV) systems for the recording and reproducing of data in sectors arranged on the disk while suitably controlling the speed of rotation of the disk by a spindle motor, for example, as shown in detail in U.S. Pat. No. 4,660,189, which has a common assignee herewith.

As generally illustrated in FIG. 4, in such known apparatus for controlling the rotation of a disk 1 coupled to a spindle motor 2 through a rotary shaft 3 while a recording and reproducing head (not shown) is moved in a radial direction R relative to the disk 1, the rotary shaft 3 of the motor 2 is further connected with a rotation sensor 4, such as, a frequency generator or the like, that provides a pulsed signal with a frequency corresponding to the rotational speed of the disk 1. Such pulsed signal is applied to a rotational speed detector circuit 5 which, in response thereto, provides a rotational speed signal S1 having a value or level corresponding to the rotational speed of the disk. The rotational speed signal S1 is supplied to one input terminal of a comparator circuit 6 which, at another input terminal, receives a predetermined reference signal S2 from a terminal 7. The comparator circuit 6 compares the received rotational speed signal S1 with the reference signal S2 and provides a corresponding difference signal S3 which is supplied to a motor drive circuit 8. The motor drive circuit 8 drives the motor 2 in response to the difference signal S3 so as to vary the rotational speed of the motor 2, and hence of the disk 1, in the direction for reducing the difference signal S3 to 0, that is, in the direction for equating the rotational speed signal S1 with the reference speed signal S2. Thus, the control circuit illustrated in FIG. 4 constitutes a so-called servo loop. Although, in practice, such servo loop desirably includes a phase control loop and a velocity control loop as well as a phase compensating circuit for increasing the servo accuracy, such additional circuits are not shown in FIG. 4 for the sake of simplicity.

When recording and reproducing signals on the disk 1 in accordance with the CAV system, the rotational speed of the disk 1 is maintained constant, that is, the reference signal S2 applied to the comparator circuit 6 has a constant value, and, as a result thereof, a relatively short access time is attainable even when moving the head a relatively large radial distance on the disk. As shown in FIG. 5A which represents the format of the disk 1 when recorded according to the CAV system, the hatched areas 10 and 11 needed to record unit sectors in respective tracks adjacent the inner and outer peripheries, respectively, of the recordable area of the disk have different peripheral lengths. More specifically, the length in the peripheral direction along each track that is required to record a unit sector is progressively increased from track to track from the inner periphery to the outer periphery of the area of the disk available for recording of data. By reason of the foregoing, when using the CAV system, the recording density is progressively lowered from track to track in the radial direction from the inner periphery to the outer periphery of the recordable area of the disk 1 so that, when considered in the aggregate, the recording capacity is relatively small.

In the case of the CLV system, the rotational speed at which the disk 1 is rotated during recording and reproducing data thereon is changed from track to track in inverse proportion to the radius of the track on the disk then being scanned for the recording or reproducing of data thereon. As a result of the foregoing, when the disk 1 is recorded according to the CLV system, the format thereof illustrated on FIG. 5B is characterized by areas of equal peripheral lengths required for the recording of unit sectors in tracks adjacent the inner and outer peripheral areas of the recordable area of the disk, as indicated by the shaded or hatched areas 12 and 13, respectively. Accordingly, the same recording density is obtained on each of the tracks comprising the recordable area of the disk with the result that a theoretically maximum recording capacity is achieved. Such recording capacity attainable through the use of the CLV system is about 1.5 times the recording capacity attained when using the CAV system.

However, when using the CLV system, in order to maintain the linear velocity at a constant value, the rotational speed or angular velocity of the spindle motor 2 must be changed in accordance with changes in the position of the recording and reproducing head in the radial direction R of the disk 1. In other words, the value of the reference signal S2 supplied to the comparator circuit 6 (FIG. 4) must be varied as a function of the number of the track being scanned by the recording and reproducing head, which number is counted in the radially outward direction. Thus, when using the CLV system, the rotational speed of the disk must be changed in accordance with access movements of the recording and reproducing head. The need to change the rotational speed of the disk with changes in the position of the track being scanned by the recording and reproducing head requires a substantial increase in the access time when the recording and reproducing head is moved a relatively large radial distance, for example, from a track near the inner periphery to a track near the outer periphery of the recordable area of the disk. The increased access time is required to permit the necessary substantial change in the rotational speed of the disk which is opposed by the inertial tendency of the disk to continue rotation at its original speed.

In both the CAV system and the CLV system, the number of sectors recorded and reproduced per unit time is the same when the head scans any of the tracks within the recordable area of the disk. Therefore, in the case of the CAV system and in the case of the CLV system, the frequency of the clock employed for the recording and reproducing operation performed anywhere within the recordable area of the disk is unchanged.

The MCAV system seeks to effectively utilize the advantages of the CAV system, that is, the relatively short access time of the CAV system, while increasing the recording capacity relative to the latter. As shown in FIG. 5C which illustrates the format of a disk 1 recorded by the MCAV system, it will be seen that, in such case, the recordable area of the disk is divided into a plurality of physically predetermined zones 16a, 16b, 16c, arranged successively in the radially outward direction and each comprised of a respective plurality of circular tracks, and the recording and reproducing is carried out in accordance with the CAV system in each of the zones 16a, 16b, 16c. When the recording and reproducing head moves from one zone to the next, the frequency of the recording and reproducing clock is changed to the maximum clock frequency that can be utilized within the newly encountered zone for effecting the recording and reproducing operations therein. As a result of the foregoing, the hatched areas 17a, 17b and 17c required for the recording of unit sectors in the radially innermost tracks of the zones 16a, 16b, 16c, respectively, are of the same lengths. Therefore, the recording density is the same in each of the tracks, and the number of sectors recorded in each track is increased from zone to zone in the radially outward direction. Since the frequency of the recording and reproducing clock is changed from zone to zone in the MCAV system, the data transfer rate is similarly changed from zone to zone in such system.

Referring now to FIG. 6 for a graphic comparison of the recording capacities of disks recorded according to the CAV, CLV and MCAV systems, respectively, it will be seen that the abscissa represents the radius of the disk from the radius $r_0$ of the track at the inner periphery of the recordable area of the disk to the radius $r_{max}$ of the track at the outermost periphery of the recordable area, while the ordinate represents the number of sectors in each of the tracks having a radius between $r_0$ and $r_{max}$. The horizontal dashed line on FIG. 6 represents the number of sectors in each of the tracks between the radii $r_o$ and the $r_{max}$ on a disk recorded according to the CAV system; the upwardly inclined solid line represents the numbers of sectors in the tracks between the radii $r_o$ and the $r_{max}$ on a disk recorded according to the CLV system; and the upwardly stepped dot-dash line represents the numbers of sectors in the tracks between the radii $r_o$ and $r_{max}$ on a disk recorded according to the MCAV system. Therefore, the rectangular area under the dashed horizontal line on FIG. 6 represents the recording capacity of a disk recorded according to the CAV system, the trapezoidal area under the inclined solid line on FIG. 6 represents the recording capacity of a disk recorded according to the CLV system, and the area under the stepped dot-dash line on FIG. 6 represents the recording capacity of a disk recorded according to the MCAV systems. From the foregoing, it is apparent that the CLV system affords the maximum recording capacity which is theoretically 1.5 times the recording capacity attainable by the CAV system and only slightly larger than the recording capacity attainable by the MCAV system.

Although the CAV, CLV and MCAV systems have certain respective desirable characteristics, each of these known systems is burdened with a respective disadvantage. Thus, for example, although the CAV system has a short access time, as described above, the recording density measured in the peripheral direction along each track is decreased from track to track in the radially outer direction with the result that the overall recording capacity is relatively small.

Although the CLV system provides a relatively large recording capacity which, as noted above, is theoretically 1.5 times the recording capacity attainable with the CAV system, the rotational speed of the disk being recorded or reproduced must be changed from track to track, that is, in accordance with the radial position of the recording and reproducing head, so as to achieve the desired constant linear velocity and, as a result of the need to effect such changes in the rotational speed, the access time is undesirably increased.

Although the MCAV system can obtain a recording capacity substantially equal to that of the CLV system while employing a constant rotational speed so that the access time is desirably short, the frequency of the recording and reproducing clock is changed as the head moves radially from one to another of the physically predetermined zones into which the recordable area of the disk is divided so that it is necessary to constantly effect accurate control of the absolute address or radial position of the recording and reproducing head. Furthermore, since the data transfer rate is changed upon each change in the frequency of the recording and reproducing clock at the inner and outer peripheries of each zone while the rotational speed of the disk remains constant, effecting the desired control becomes complicated.

OBJECTS AND SUMMARY OF THE INVENTION

Accordingly, it is an object of the present invention to provide a disk recording and/or reproducing system capable of achieving a high recording capacity and a short access time, while avoiding the previously noted disadvantages of the known systems.

More specifically, it is an object of this invention to provide a disk recording and/or reproducing system having a relatively high recording capacity similar to that obtained with the CLV system while affording a short access time similar to that achieved with the CAV system, and in which the control difficulties encountered in connection with the MCAV system are avoided.

In accordance with an aspect of this invention, in recording and/or reproducing data on a disk formatted in accordance with a constant linear velocity (CLV) system while the disk is rotated and a head is movable in a radial direction relative to the disk for scanning radially successive circular tracks thereon, and a recording and/or reproducing circuit connected with the head is operable in response to a data transfer clock for causing the head to record and/or reproduce data in the tracks scanned thereby: the disk is virtually divided into a plurality of virtual zones arranged successively in the radial direction and each comprised of a respective plurality of the tracks; the frequency of the data transfer clock during a recording or reproducing operation is determined in dependence on the one of the virtual zones in which the tracks being scanned are situated at least during the initiation of the recording or reproducing operation, with the frequency determined at the initiation of a recording or reproducing operation being increased step wise for each of the successive zones considered in the radially outward direction and being maintained substantially constant at least so long as the tracks being scanned are in the one of the zones at which the recording or reproducing operation was initiated; and an angular velocity at which the disk is rotated during the recording or reproducing of data in the tracks within any one of the virtual zones is decreased so long as successive tracks, considered in the radially outward direction, are scanned during the recording or reproducing operation in which the frequency of the data transfer clock is maintained substantially constant.

In one operating mode of an embodiment of this invention, during the recording and/or reproducing of data on a disk formatted in accordance with a constant linear velocity system, as aforesaid, in the event that a recording or reproducing operation continues during scanning of tracks in a virtual zone adjacent the one virtual zone in which such operation was initiated, during the continued scanning of tracks in the adjacent virtual zone, the frequency of the data transfer clock remains unchanged at the frequency thereof determined for the one virtual zone in which the recording or reproducing operation was initiated.

In accordance with an advantageous feature of this invention, the angular velocity at which the disk is rotated is determined by a servo in response to a rotational speed reference signal, and such rotational speed reference signal, and hence the angular velocity of the disk, is decreased as successive tracks, considered in the radially outward direction, are scanned within any one of the virtual zones.

The above, and other objects, features and advantages of the invention, will be apparent in the following detailed description of an illustrative embodiment thereof which is to be read in connection with the accompanying drawings.

BRIEF DESCRIPTION OF THE DRAWINGS

FIG. 1A is a diagram illustrating the manner in which the recordable area of an optical disk is divided into virtual zones according to an embodiment of the present invention;

FIG. 1B is a diagram illustrating the manner in which the frequency of a data transfer or recording and reproducing clock is changed for the several virtual zones of FIG. 1A in accordance with an embodiment of the present invention;

FIG. 1C is a diagram illustrating variation of the angular velocity with each of the virtual zones of the disk, and to which reference will be made in explaining fluctuation of angular velocity in the case of a specific numerical example of the described embodiment of this invention;

DESCRIPTION OF A PREFERRED EMBODIMENT OF THE INVENTION

Figure 5A:
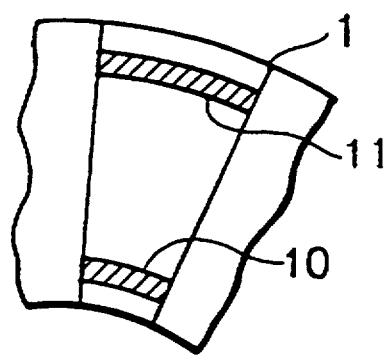
FIGS. 5A, 5B and 5C are fragmentary diagrammatic views of the recordable area of disks recorded with formats of the CAV, CLV and MCAV systems, respectively.
Figure 5B:
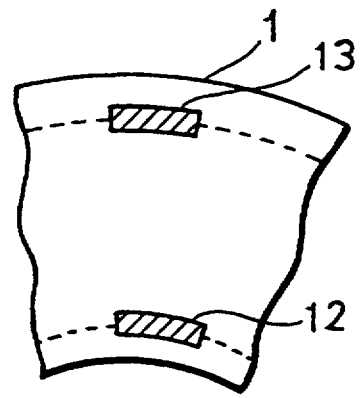
Figure 5C:
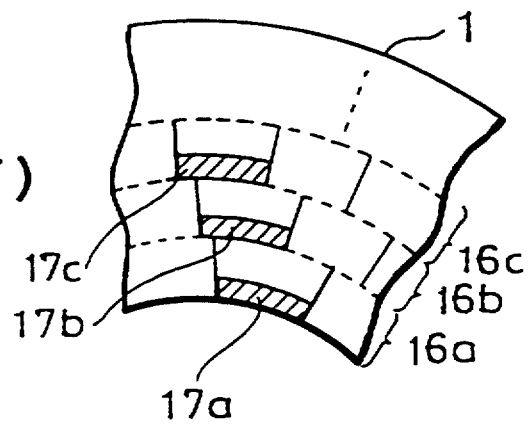
Figure 6:
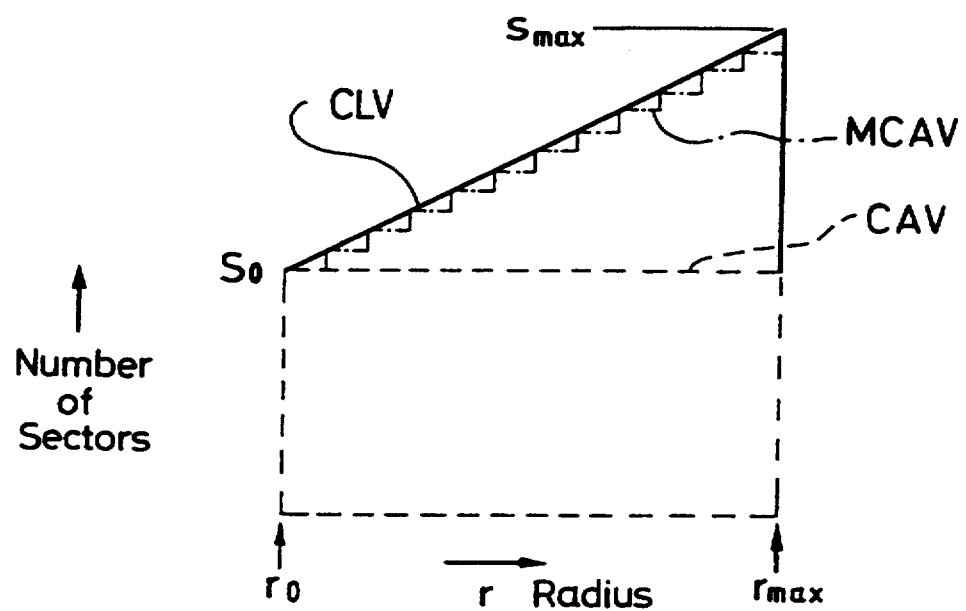
FIG. 6 is a diagram to which reference is made in explaining the relative recording capacities of disks recorded with the formats shown in FIGS. 5A, 5B and 5C, respectively.

Generally in accordance with the present invention, a disk, such as, a write once optical disk, is formatted according to the CLV system shown in FIG. 5B and, during recording and/or reproducing of data on such disk, the recordable area thereof extending between the inner periphery having the radius $r_0$ and the outer periphery having the radius $r_{max}$ on FIG. 1A is virtually divided into m virtual zones V (V=1, 2, 3, ..., i, i+1, ..., m-2, m-1, m) arranged successively in the radial direction R and each comprising a respective plurality of radially successive substantially circular tracks. Although the total number of the virtual zones V is m, zone numbers n (n=0, 1, 2, 3, ..., i-1, i, ..., m-1) are assigned to the respective virtual zones V, as shown on FIG. 1A.

Further, generally in accordance with the present invention, and as illustrated in FIG. 1B, the frequency f of a data transfer clock used during a recording or reproducing operation is determined in dependence on the one of the virtual zones V in which the recording or reproducing operation is initiated, with such frequency f determined at the initiation of a recording or reproducing operation increasing step wise for each of the successive zones V considered in the radially outward direction and being maintained substantially constant at least so long as the recording or reproducing operation is being continued in the virtual zone in which it was initiated. Moreover, during the recording or reproducing of data within any one of the virtual zones of the recordable area of the disk, the angular velocity at which the disk is driven is progressively decreased as data is recorded or reproduced in successive tracks, considered in the radially outward direction, within that one virtual zone, for example, as shown on FIG. 1C, whereby the recording or reproducing of data within each zone V is effected at a constant linear velocity, and hence with a constant linear recording density.

Further, generally in accordance with the present invention, the total number m of the divided virtual zones V can be selected or varied in dependence on the desired or optimum access time and data transfer rate, by which the degree of fluctuation of the rotational speed of the disk and the degree of fluctuation of the data transfer rate can be varied.

Furthermore, in accordance with one embodiment of the present invention, when a recording or reproducing operation is initiated in a predetermined virtual zone, for example, in the zone V=i, and is continued in the adjacent virtual zone V=i+1, the frequency f of the data transfer or recording and reproducing clock is not changed for the virtual zone V=i+1, but rather remains at the frequency f determined for the virtual zone V=i during the continued recording or reproducing in the virtual zone V=i+1.

By varying the total number m of the virtual zones V in dependence on the access time and the data transfer rate, the fluctuation of the rotational speed, as in FIG. 1C, and the fluctuation of the data transfer rate or frequency, as in FIG. 1B, can be varied. Therefore, taking into account the torque or other capability of the motor used for driving the disk, it is possible to obtain an optimum design of a disk recording and reproducing apparatus in accordance with the invention. Since the radial points at which the frequency of the data transfer clock is changed are virtual and can be varied or controlled, it is possible to change the characteristics of the apparatus as desired between a condition in which the data transfer rate is substantially constant (that is, a condition substantially equivalent to the CLV system) and the condition in which the importance of minimum access time is emphasized (that is, in which the rotational speed is substantially constant, as in the CAV system).

It will be appreciated that, in accordance with the above stated general principals of the invention, the disk formatted according to the CLV system is divided into the virtual zones V arranged successively in the radial direction, the data transfer clock has its frequency f increased step wise for the successive virtual zones considered in the radially outward direction and is maintained substantially constant at least so long as the recording or reproducing operation continues in the zone in which it was initiated, and the rotational speed or angular velocity of the disk is decreased with increases in the radius within the virtual zone in which the recording or reproducing operation is occurring, whereby recording or reproducing at a constant linear recording density can be carried out. In other words, in accordance with the invention, the recording capacity of the disk can have a theoretically maximum value similar to that achieved with the CLV system. Further, since the angular velocity or rotational speed of the disk is changed only to a relatively small extent within each virtual zone, that is, at the inner periphery of each of the virtual zones V the angular velocity is returned to the same value, as is apparent on FIG. 1C, the change in the rotational speed of the disk between a recording or reproducing operation on an inner peripheral portion of the disk and a recording or reproducing operation on an outer peripheral portion of the disk is substantially suppressed and hence the effected change in rotational speed is only slightly resisted by inertia of the rotating disk. By reason of the foregoing, when recording or reproducing in accordance with the present invention, an access time nearly equal to that achieved with the CAV system can be obtained.

Figure 2:
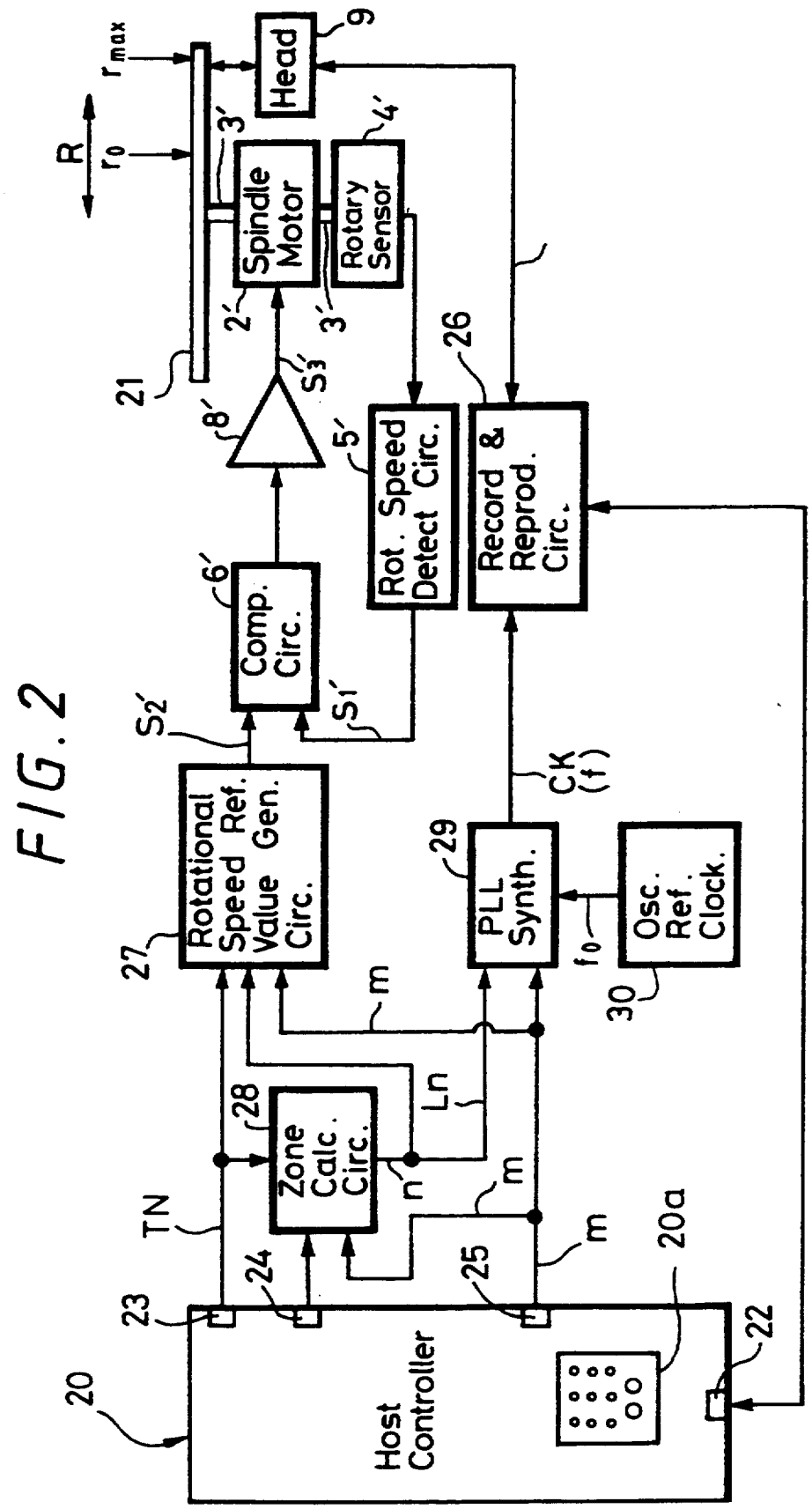
FIG. 2 is a block diagram showing a circuit arrangement of a recording and reproducing apparatus in accordance with an embodiment of the present invention.

Referring now to FIG. 2, it will be seen that an apparatus according to an embodiment of this invention for recording and/or reproducing information or data on a disk type recording medium, such as, an optical disk 21, includes a host controller or CPU 20 having ports or terminals 22, 23, 24 and 25 through which various data and signals are exchanged with other components of the apparatus. More specifically, the terminal 22 is shown to be connected with a recording and reproducing circuit 26 for supplying to the latter information or data to be written or recorded on the disk 21, together with a recording or reproducing command signal, such as, for example, a corresponding header address and sector length signal which, in the case of the recording mode, identifies where on the disk 21 the corresponding data or information is to be recorded or written, and, in the reproducing or reading mode, identifies the location on the disk of the data or information to be read or reproduced therefrom. Further, in the reproducing mode of the apparatus, the data or information read from the disk 21 is output from the circuit 26 to the terminal 22 for processing in the latter. By way of example, the recording or reproducing command signals supplied from the terminal 22 to the recording and reproducing circuit 26 may be generated by the controller or CPU 20 in response to manipulation of a keyboard indicated at 20a.

Figure 4:
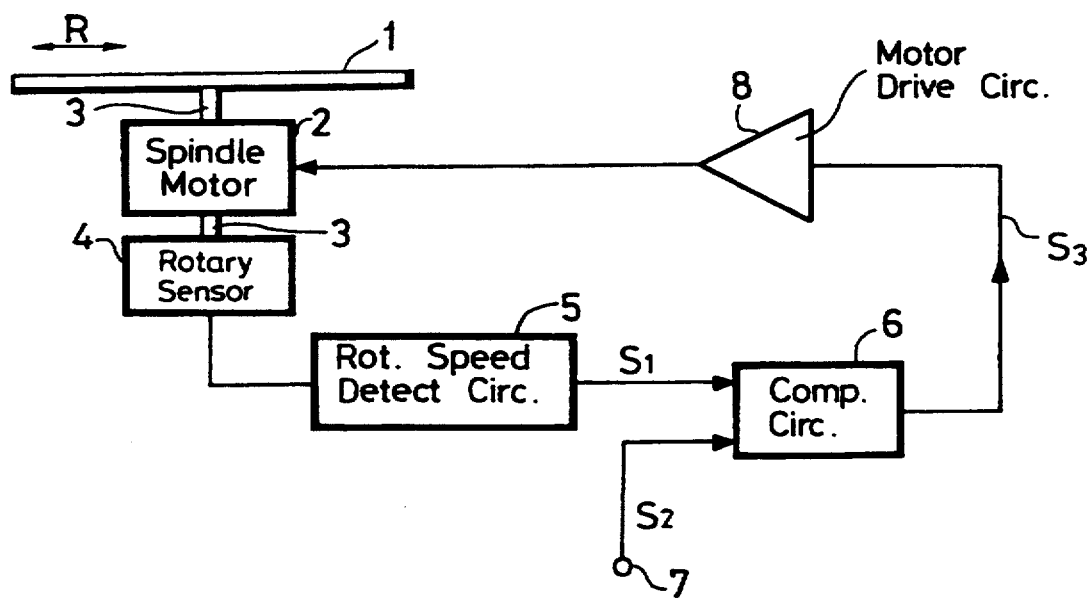
FIG. 4 is a block diagram showing a servo control circuit according to the prior art for controlling the rotation of a disk in a recording and/or reproducing apparatus.

Similarly to the arrangement in FIG. 4, the disk 21 is shown on FIG. 2 to be rotated by a spindle motor 2' through a rotary shaft 3' while a recording and reproducing head 9 connected with the recording and reproducing circuit 26 is suitably moved in the radial direction R relative to the disk. As before, the rotary shaft 3' of the motor 2' is also connected with a rotation sensor 4' such as a frequency generator or the like, providing a pulsed signal with a frequency corresponding to the rotational speed of the disk. Such pulsed signal is applied to a rotational speed detecting circuit 5' which, in response thereto, provides a rotational speed signal $S'_1$ having a value or level corresponding to the rotational speed of the disk 21. The rotational speed signal $S'_1$ is shown to be supplied to one input terminal of a comparator circuit 6' which, at another input terminal, receives a rotational speed reference signal $S'_2$ from a rotational speed reference value generating circuit 27. The comparing circuit 6' compares the rotational speed indicated by the rotational speed signal $S'_1$ with a rotational speed reference value indicated by the signal $S'_2$ and the difference therebetween is supplied to a drive circuit 8' which provides a corresponding drive signal $S'_3$ to the spindle motor 2'. As before, the drive circuit 8' controls the spindle motor 2' so as to vary the rotational speed thereof in the direction for reducing the difference, if any, between the rotational speed signal $S'_1$ and the rotational speed reference signal $S'_2$. Thus, a so-called servo loop is provided which may desirably include a phase control loop and a velocity control loop as well as a phase compensating circuit for increasing the servo accuracy.

It will be appreciated that the head 9, in moving in the radial direction R relative to the disk 21 while the latter is rotated, scans radially successive substantially circular tracks arrayed on a recordable area of the disk which has its inner and outer peripheries at the radii $r_0$ and $r_{max}$, respectively.

In the illustrated apparatus in accordance with the present invention, the host controller or CPU 20 provides, at its terminal 23, a track number signal or data TN which identifies the radial position, counted in a radially outward direction from the radius $r_0$ at the inner periphery of the recordable area of the disk 21, of a respective one of the tracks then being scanned by the head 9 for the recording or reproducing of information in such track. The track number signal TN is supplied to the rotational speed reference value generating circuit 27 and also to a zone calculating circuit 28. The zone calculating circuit 28 may be desirably constituted by a random access memory (RAM) forming a table addressed by the track number TN so as to output a zone number signal n which identifies the one of the virtual zones V in which the track identified by the track number TN is situated. The zone calculating circuit 28 further receives, from the terminal 24 of the CPU 20, control data by which data contained in the RAM constituting the zone calculating circuit 28 are rewritten when a change is effected in the total number m of the virtual zones V into which the recordable area of the disk 21 is virtually divided. Finally, the zone calculating circuit 28 receives, from the terminal 25 of the CPU 20, a total zone number signal representing the total number m of the virtual zones arranged successively in the radial direction and into which the recordable area of the disk is virtually divided. Although the zone calculating circuit 28 has been described as being desirably formed by a RAM table, it may be alternatively provided as a suitable logic circuit.

In any event, the zone number signal n from the zone calculating circuit 28 and the total zone number signal m from the terminal 25 are supplied, along with the track number signal TN, to the rotational speed reference value generating circuit 27 which may be constituted by a microprocessor or the like for determining the rotational speed reference signal S'$_2$ therefrom.

The zone number signal n from the zone calculating circuit 28 and the total zone number signal m from the terminal 25 are also supplied to a data transfer clock synthesizer 29 which is preferably in the form of a phase locked loop (PLL) receiving a reference frequency f$_0$ from a reference oscillator 30. The synthesizer 29 provides a data transfer clock CK with a frequency f which is determined on the basis of the zone number signal n and the total zone number signal m, and such data transfer clock CK is supplied to the recording and reproducing circuit 26 for determining the rate of data transfer during a recording or reproducing operation.

The above described embodiment of the invention operates as follows:

When a recording or reproducing command from the host controller or CPU 20 is supplied through its terminal 22 and the track number TN of the track in which the data or information is to be recorded or reproduced in response to the recording or reproducing command is supplied through the terminal 23 to the zone calculating circuit 28, the zone number n of the virtual zone in which such track number TN is situated is output from the zone calculating circuit 28.

In a first operating mode of the apparatus embodying this invention, the control data from the terminal 24 of the CPU 20 causes the circuit 28 to calculate the zone number n only at the initiation of a recording or reproducing operation, that is, the zone number n identifies the virtual zone containing the track in which the recording or reproducing of the information signal or data is to be initiated, and such zone number n remains unchanged even if the recording or reproducing operation continues in tracks situated in the next adjacent virtual zone.

In a second operating mode that may be alternatively selected by the operator, the control data from the terminal 24 causes the circuit 28 to continuously calculate the zone number n during a recording or reproducing operation. In that case, if the recording or reproducing of the information signal or data is initiated in one virtual zone and is continued in the next adjacent virtual zone, the zone number n will change at the margin or demarcation between such virtual zones.

The synthesizer 29 determines the frequency f of the generated data transfer clock CK from the reference frequency f$_0$, the zone number n and the total zone number m in accordance with the following equation (1) and supplies the data transfer clock thus generated to the recording and reproducing circuit 26.

$$f = \{1 + (n/m)\} \cdot f_0 \quad (1)$$

The frequency f of the data transfer clock CK is seen to be equal to the reference frequency f$_0$ when the zone number n = 0. If, for example, the total zone number m = 64, then the maximum frequency f$_{max}$ of the data transfer clock CK for the outermost virtual zone, that is, for n = 63, becomes f$_{max}$ = (1 + 63/64) f$_0$. In such case, the frequency of the data transfer clock CK ranges from its minimum value at the innermost virtual zone to approximately twice such minimum value at the outermost virtual zone.

In response to the data transfer clock CK thus generated, the recording and reproducing circuit 26 is operated at the same frequency f at least so long as the tracks being scanned by the head 9 are situated within the same virtual zone (V = i + 1) corresponding to the zone number n = i. FIG. 1B illustrates how the value of the data transfer clock frequency f generated by the synthesizer 29 on the basis of equation (1) is changed or increased stepwise for each of the successive virtual zones V considered in the radially outward direction, with such frequency f being maintained substantially constant at least so long as the tracks being scanned are in the same one of the virtual zones at which the recording or reproducing operation was initiated. In other words, the data transfer clock frequency f is constant within the same virtual zone V (for example, f = fi at virtual zone V = i + 1, for which n = i in FIG. 1A).

The rotational speed of the optical disk 21 is controlled in accordance with the following equation (2)

$$\omega = \frac{\{1 + (n/m)\} \, r_0 \cdot \omega_0}{r} \quad (2)$$

In which r is the radius of the disk 21 at the track to be scanned by the head 9 and is uniquely determined by the track number TN, $\omega$ is the angular velocity at the radius r, n is the zone number in which track number TN is situated, m is the total zone number, r$_0$ is the radius at the innermost periphery of the recordable area of the disk and $\omega_0$ is the angular velocity at the radius r$_0$. On the basis of equation (2), the value of the rotational speed reference signal s'$_2$ can easily be generated by the rotational speed reference value generating circuit 27 from the received signals TN, n and m.

As will be clear from equations (1) and (2), when the total zone number m is set to m = 1, n = 0. The resulting system would be the same as the conventional CLV system. Therefore, by suitably selecting the total zone number m, the changes of the access time and the data transfer clock frequency (change of data transfer rate) can be varied as shown on the following Table 1.

TABLE 1

|  | Present system | | CLV System |
|---|---|---|---|
| Total zone number (m) | m is large number, for example m = 64 | m is small number greater than 1 | m = 1 |
| Access Time | Short | Access time increases as value of m is decreased toward m is small number greater than 1 | Long |
| Change of Data Transfer Rate | Relatively large; for example, when m = 64, the data transfer rate or frequency f of clock CK at the outer periphery of recordable area of disk is about twice as large as the frequency f at the inner | Small | None |

TABLE 1-continued

| | Present system | CLV System |
|---|---|---|
| periphery of the recordable area | | |

Study of Table 1 reveals that, as the value of the total zone number m is increased from 1, the access time is progressively reduced and the change of the data transfer rate is altered progressively from the state in which the data transfer rate is unchanged to the state in which the change of the data transfer rate becomes progressively larger.

Therefore, in accordance with this embodiment of the invention, the optimum total zone number m for the system can be selected and set in order to provide desired characteristics of access time and data transfer rate.

The virtual zones V into which the recordable area of the disk 21 are thus divided are only virtual zones and it is to be noted that physically divided zones do not exist on the optical disk 21. Therefore, the radial width of each virtual zone V, and hence the total number thereof, can be changed as necessary.

When the head 9 is moved across an arbitrary virtual zone (V=i) and reaches the adjacent virtual zone (V=i+1) while data are continuously being recorded on the arbitrary virtual zone V (V=i), if the frequency f of the data transfer clock CK is switched, or changed to the next higher frequency, as in FIG. 1B, the rotational speed of the spindle motor 2 is also restored rapidly to the rotational speed $\omega_0$, as on FIG. 1C. Such rapid change in the rotational speed is quantitatively small. If, nevertheless, it is desired to isolate the spindle motor 2' from such rapid rotational speed fluctuation, the user may select the previously described operating mode in which the circuit 28 calculates the zone number n only at the initiation of a recording or reproducing operation. In such case, even when the head 9 is moved to the adjacent virtual zone (V=i+1), the frequency f of the data transfer clock CK is not changed and the frequency $f_i$ of th data transfer clock CK established at the initiation of the recording or reproducing operation in the virtual zone (V=i) is utilized during the continued recording or reproducing in the next adjacent virtual zone (V=i+1). Then, the rotation of the optical disk 21 is controlled in a manner consistent with the continued use of the frequency $f_i$ for the data transfer clock DK, that is, the rotational speed of the disk is further progressively decreased along an extension of the line in FIG. 1C for the zone V=i during the continuation of the recording or reproducing in the adjacent virtual zone v=(i+1). It will be apparent that, when using the herein described mode of operation, even small rapid changes in the rotational speed may be avoided, while achieving a substantially constant linear recording density.

Figure 3:
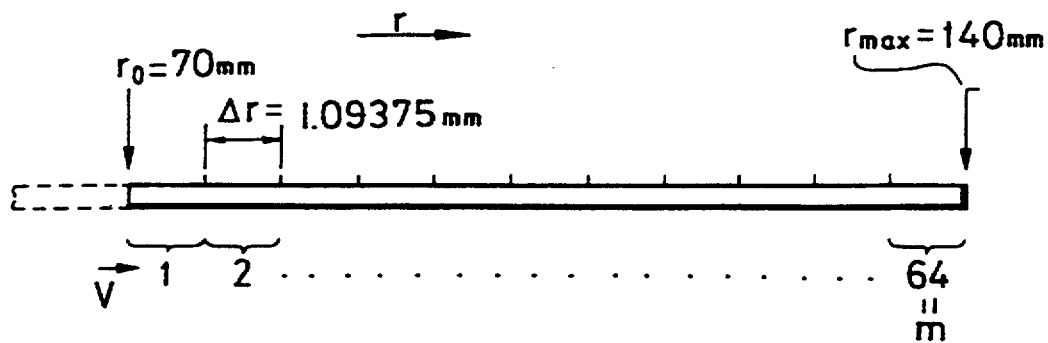
FIG. 3 is a diagram to which reference will be made in explaining an embodiment of the invention having specific numerical values.

Referring now to FIG. 3, it will be seen that, when the disk 21 is a write once optical disk, for example, having $r_0=70$ mm, $r_{max}=140$ mm and the total zone number m=64, the fluctuation or change in the rotational speed of the disk 21 used for recording or reproducing in the next adjacent virtual zones may be calculated as follows. Each instruction of the recording or reproducing command from the CPU 20 generally has a range within one zone. Accordingly, even when the head moves radially out of the zone in which the recording or reproducing operation was initiated such range becomes +1.

The Capacity of an area recorded or reproduced in response to one instruction is about 2MB (megabytes) in response to a memory, for example, a buffer memory (not shown) such as is utilized in a so-called verifying process or the like, and corresponds to 2000 sectors. A track at the radius $r_0$ of the optical disk 21 has 50 sectors. Even if all tracks had 50 sectors, the number of tracks in the area recorded and reproduced in response to one instruction would be 40 tracks. In actual practice, the number of sectors in the track at the radius $r_{max}$ is 100 sectors.

If the track pitch is 0.016 mm, the aggregate width of 40 tracks in the radial direction R is 0.64 mm. Since the radial width $\Delta r$ of one zone is $\Delta r=(r_{max}-r_0)/m=(140-70)/64=1.09375$ mm, the radial range accessed in response to one instruction, which in this example is 0.64 mm, is generally well within the radial width (1.09375 mm) of one zone. Therefore, it is to be understood that, even when the movement of the head 9 exceeds the aggregate width of a zone, the range of movement is a range of +1 ($1.09375<2\times0.64<2\times1.09375$).

For calculating the fluctuation or change in the rotational speeds used for recording or reproducing in the adjacent virtual zones V, the following equation (3) is obtained from the equation for the CLV system.

$$(r_0 \cdot \omega_0/f_0) = (r_i \cdot \omega_i/f_i) \qquad (3)$$
$$= (r_i \cdot \omega_i)/\{1 + (i/64)\} \cdot f_0$$

In the above equation (3) $f_0$ is the data transfer clock frequency at the virtual zone V=0, $\omega_0$ is the angular velocity at the radius $r_0$, that is, at the inner periphery of the virtual zone V=0, $f_i$ is the data transfer clock frequency at the virtual zone V=i and $\omega_i$ is the angular velocity thereof. Equation (3) may be rewritten as the following equation (4).

$$\omega_i = (r_0/r_i) \cdot \{1+(i/64)\}\omega_0 \qquad (4)$$

When i=0, equation (4) becomes $(\omega_i/\omega_0)=(r_0/r_i)$. Further when i=0, $r_i=r_0$ within the virtual zone V=0 so that the rotational speed fluctuation $(\omega_i\omega_0)$ is expressed as $(\omega_0/\omega_0)=1.0$. Hence, in the adjacent virtual zone V=0, $r1=r_0+\Delta r$. Therefore, the rotational speed fluctuation or ratio $(\omega 1/\omega_0)$ is expressed as $(\omega 1/\omega_0)=r_0/(r_0+\Delta r)=1/\{\Delta r/r_0\}$ $\}=1/\{1+(70/1.09375)\}=0.9846$, which is a rotational speed difference of 1.54%. This difference of 1.54% is a value well within a servo range of a rotational speed servo including the spindle motor 2'. In general, about 25 ms is required for the servo to follow a fluctuation of 2% and, therefore, the servo can follow the rotational speed fluctuation of 1.54% in a time less than about 25 ms.

Since the time of about 25 ms is sufficiently short, as compared with an average access time of 150 ms that is determined by the average time required for the head to move in the radial direction of the optical disk according to the CAV system, the average access time for the above numerical example of the system embodying the present invention is substantially equal to that of the CAV system. On the other hand, in the case of such numerical example if the disk is not divided into the virtual zones in accordance with the invention, or in the case of the CLV system, the average access time lies in a range of from 600 ms to 800 ms. It is to be appreciated from the foregoing that, in the numerical example of the present invention the average access time (150 ms.) is reduced about four times or more as compared with the CLV system.

Angular velocity or rotational speed fluctuations between adjacent virtual zones $V=i$ and $V=(i+1)$ for $i=1$ to 63 can be calculated as follows:

When $i=1$, $1.0/0.9848[=1/\{1+1.09375/71.09375)\}]$ and the speed difference is 1.52%.

when $i=63$, $1.0/0.9848[=1/\{+(1.09375/x)\}]$ and the speed difference is 0.78% (where $x=(70+63\cdot\Delta_r)$, In the numerical example illustrated on FIG. 3, the ratio of $r_{max}$ and $r_0$ is set to $r_{max}/r_0=2$ so that angular velocities at the switching positions of the virtual zones V all become $\omega_0$. Accordingly, the angular velocity ratios ($\omega_i/\omega_0$) at the switching positions all become 1 as shown in the following equation (5):

$$\omega_i = (r_0/r_i)\{1+(i/m)\}\omega_0$$

$$\omega_i = \{r_0/(r_0+i\Delta r)\}\cdot Y\cdot\omega_0, \text{ where } Y=\{1+(i/m)\}$$

$$\omega_i = [r_0/\{r_0+i\ (r_{max}-r_0)/m\}]\cdot Y\cdot\omega_0$$

$$\omega_i = [1/\{1+1\ (r_{max}/r_o-1)/m\}]\cdot Y\cdot\omega_0$$

$$\omega_i = [1/\{1+i\ (2-1)/m\}]\cdot Y\cdot\omega_0$$

$$\omega_i = (1/Y)\cdot Y\cdot\omega_0$$

$$\omega_i = \omega_0 \tag{5}$$

FIG. 1C shows a characteristic of angular velocity ratio $\omega_i/\omega_0$ together with the above calculated results. From this, it is to be understood that the fluctuation of the angular velocity ratio $\omega_i/\omega_0$ falls within 2% in this numerical example and is in any case very small.

In the above described embodiment of the present invention, the number of the divided virtual zones V can be altered in dependence on the access time and the data transfer rate, whereby the fluctuation of the rotational speed and the fluctuation of the data transfer rate can be varied. Consequently, a disk recording and reproducing apparatus can be designed which is the optimum in view of a characteristic, such as, the torque of the motor or the like. That is to say, the points at which the frequency of the recording and reproducing clock CK is changed are virtual and can be controlled so that the data transfer rate is made constant (as in the CLV system), if necessary, or so that emphasis is placed on the access time by making the rotational speed substantially constant.

Further, when, in one of the operation modes of the described embodiment of the invention, the recording and reproducing area is moved to the virtual zone $V=i+1$ from the adjoining virtual zone $V=i$ in which the recording or reproducing operation was initiated, the frequency f of the recording and reproducing clock CK is not varied and such virtual zone ($V=i+1$) is continuously recorded and reproduced by the recording and reproducing clock having the frequency $f_i$ set for initial virtual zone ($V=i$). In that case, the switching of the recording and reproducing clock CK during a recording or reproducing operation become unnecessary and the switching control of the recording and reproducing clock CK is facilitated.

However, as earlier described, the apparatus embodying the present invention is not limited to the above operating mode, but instead may be operated in a mode in which, as a recording or reproducing operation is continued from one virtual zone to an adjacent virtual zone, the frequency of the recording or reproducing clock is changed at the demarcation between the virtual zones.

When data is recorded on the optical disk 21 according to the described embodiment of the invention in which the disk is divided into the virtual zones V, the recorded data is reproduced according to the CLV system upon playback, whereby the transfer clock rate becomes constant. Thus, the present invention can be applied to the case where a picture is reproduced on a display monitor (not shown) or vice versa.

While the present invention has been described as applied to a write once optical disk, the present invention is not limited thereto and may be applied to an erasable magneto-optical disk, a CDROM or a floppy disk or the like.

Having described a specific embodiment of the present invention with reference to the drawings, it is to be understood that the invention is not limited to that precise embodiment, and that various changes and modifications may be effected therein by one skilled in the art without departing from the scope or spirit of the invention as defined in the appended claims.

What is claimed is:

1. In an apparatus for processing data on a disk formatted in accordance with a constant linear velocity (CLV) system and which comprises drive means for rotating said disk, head means movable in a radial direction relative to said disk for scanning radially successive substantially circular tracks on the disk, and circuit means connected with said head means and operable in response to a data transfer clock for causing said head means to selectively record or reproduce data in the tracks scanned thereby, the combination of:

means for dividing said disk into a plurality of virtual zones arranged successively in said radial direction and each comprised of a respective plurality of said tracks;

means for determining the frequency of said data transfer clock during a recording or reproducing operation in dependence on the one of said virtual zones in which the tracks being scanned are situated at least during the initiation of said recording or reproducing operation, with said frequency determined at said initiation of the recording or reproducing operation being increased stepwise for each of the successive zones considered in the radially outward direction and being maintained substantially constant at least so long as the tracks being scanned are in the one of said zones at which said recording or reproducing operation was initiated; and means for controlling an angular velocity at which said drive means rotates said disk including means operative at said initiation of each said recording or reproducing operation for establishing a predetermined value of said angular velocity and for decreasing said angular velocity so long as successive tracks, considered in said radially outward direction, are scanned during said recording or reproducing operation in which said frequency of the data transfer clock is maintained substantially constant.

2. An apparatus as in claim 1; in which said recording or reproducing operation continues during scanning of tracks in a virtual zone adjacent said one virtual zone, and in which, during the continued scanning of tracks in said adjacent virtual zone, said frequency of the data transfer clock remains unchanged at the frequency thereof determined for said initiation of the recording or reproducing operation in said one virtual zone.

3. An apparatus as in claim 1; in which said recording or reproducing operation continues during scanning of tracks in a virtual zone adjacent said one virtual zone, and in which, during the continued scanning of tracks in said adjacent virtual zone, said frequency of the date transfer clock is increased in correspondence with said adjacent virtual zone.

4. An apparatus as in claim 3; in which, during said continued scanning of tracks in said adjacent virtual zone, said angular velocity at which the drive means rotates the disk is returned to said predetermined value and then is progressively decreased so long as successive tracks, considered in said radially outward direction, are scanned in said adjacent virtual zone.

5. An apparatus as in claim 1; in which a number of said virtual zones into which said disk is divided is selected in accordance with desired values of access time and data transfer rate.

6. An apparatus as in claim 1; in which said means for controlling the angular velocity at which the drive means rotates the disk includes servo means for determining said angular velocity in response to a rotational speed reference signal having a predetermined value at each said initiation of a recording or reproducing operation, and means for decreasing said rotational speed reference signal, and hence said angular velocity, as successive tracks, considered in said radially outward direction, are scanned during said recording or reproducing operation initiated in said one virtual zone.

7. In an apparatus for recording information on a disk type recording medium and which comprises drive means for rotating the recording medium, head means movable in a radial direction relative to said disk type recording medium for scanning radially successive substantially circular tracks on the recording medium, and recording circuit means connected with said head means and operable in response to a clock signal for causing said head means to record information in tracks then scanned thereby: the combination of means for generating a total zone number signal representing a total number of virtual zones arranged successively in said radial direction and into which said disk type recording medium is virtually divided with each said virtual zone being comprised of a respective plurality of said tracks;

means for generating a track number signal representing the radial position, counted in a radially outward direction, of a respective one of said tracks scanned by said head means for the recording of said information therein;

means responsive to said track number signal and said total zone number signal for generating a zone number signal representing one of said virtual zones in which said one of the tracks is situated;

means responsive to said track number signal, said zone number signal and said total zone number signal for generating a rotational speed reference signal representing a desired rotational speed of said disk type recording medium, said drive means being operative in response to said rotational speed reference signal to rotate said disk type recording medium at a predetermined angular velocity when said head means scans a track at the radially inner periphery of each of said virtual zones and to decrease said angular velocity progressively from said predetermined angular velocity at least so long as successive scanned tracks, considered in said radially outward direction, are within the same one of said virtual zones; and means responsive to said zone number signal and total zone number signal for generating said clock signal with the frequency thereof being increased stepwise for each of the successive zones considered in said radially outward direction and being maintained substantially constant at least as long as the tracks being scanned are within one of said zones.

8. An apparatus as in claim 7; in which said means for generating a zone number signal has an operating mode in which said zone number signal identifies only the one of said virtual zones in which said one of the tracks is situated at the initiation of the recording of said information so that, if recording of information continues on tracks situated in a virtual zone adjacent said one virtual zone, the generated zone number signal remains unchanged and, in response thereto, said clock signal is maintained at the frequency determined at said initiation of recording in said one virtual zone.

9. An apparatus as in claim 8; in which said means for generating said rotational speed reference signal responds to said unchanged zone number signal generated in said operating mode when said recording of information continues on tracks situated in said adjacent virtual zones for causing said drive means to further progressively decrease said angular velocity.

10. An apparatus as in claim 8; in which said means for generating a zone number signal has a second operating mode in which said zone number signal continuously identifies the one of said virtual zones in which is situated the track being scanned at any time during the recording of information therein so that, if recording of information continues on tracks situated in a virtual zone adjacent said one virtual zone in which the recording was initiated, the resulting change in the generated zone number signal causes a corresponding change in said frequency of the clock signal.

11. An apparatus as in claim 10; further comprising means for selecting either the first mentioned operating mode or said second operating mode of said means for generating a zone number signal.

12. An apparatus as in claim 7; in which said means for generating a zone number signal continuously identifies the one of said virtual zones in which is situated the track being scanned at any time during the recording of information therein so that, if recording of information continues on tracks situated in a virtual zone adjacent said one virtual zone in which the recording was initiated, the resulting change in the generated zone number signal causes a corresponding change in the frequency of the clock signal.

13. An apparatus as in claim 7; in which said means for generating a total zone number signal is operative to change said total number of virtual zones.

14. An apparatus as in claim 7; further comprising command input means for providing a command signal representing a selected region on said disk type recording medium at which said information is to be recorded.

15. An apparatus as in claim 14; in which said command signal includes address data representative of an address on said disk type recording medium at which recording of said information is to be initiated and length data representative of the length of said information to be recorded.

16. An apparatus as in claim 7; in which said disk type recording medium is an optical disk.

17. In an apparatus for reproducing information recorded on a disk type recording medium formatted in accordance with a constant linear velocity system and which comprises drive means for rotating the recording medium, head means movable in a radial direction relative to said disk type recording medium for scanning radially successive substantially circular tracks on the recording medium, and reproducing circuit means connected with said head means and operable in response to a clock signal for reproducing information recorded in tracks then scanned by said head means: the combination of means for generating a total zone number signal representing a total number of virtual zones arranged successively in said radial direction and into which said disk type recording medium is virtually divided with each said virtual zone being comprised of a respective plurality of said tracks;

means for generating a track number signal representing the radial position, considered in a radially outward direction, of one of said tracks scanned by said head means for reproducing of the information recorded therein;

means responsive to said track number signal and said total zone number signal for generating a zone number signal representing one of said virtual zones in which said one of the tracks is situated;

means responsive to said track number signal, said zone number signal and said total zone number signal for generating a rotational speed reference signal representing a desired rotational speed of said disk type recording medium, said drive means being operative in response to said rotational speed reference signal to rotate said disk type recording medium at a predetermined angular velocity when said head means scans a track at the radially inner periphery of each of said virtual zones and to decrease said angular velocity progressively from said predetermined angular velocity at least so long as successive scanned tracks, considered in said radially outward direction, are within the same one of said virtual zones; and means responsive to said zone number signal and total zone number signal for generating said clock signal with the frequency thereof being increased stepwise for each of the successive zones considered in said radially outward direction and being maintained substantially constant at least so long as the tracks being successively scanned are within the same one of said zones.

18. An apparatus as in claim 17; in which said means for generating a zone number signal has an operating mode in which said zone number signal identifies only the one of said virtual zones in which said one of the tracks is situated at the initiation of the reproducing of said information so that, if reproducing of information continues from tracks situated in a virtual zone adjacent said one virtual zone, the generated zone number signal remains unchanged and, in response thereto, said clock signal is maintained at the frequency determined at said initiation of reproducing in said one virtual zone.

19. An apparatus as in claim 18; in which said means for generating said rotational speed reference signal responds to said unchanged zone number signal generated in said operating mode when said reproducing of information continues from tracks situated in said adjacent virtual zone for causing said drive means to further progressively decrease said angular velocity.

20. An apparatus as in claim 18; in which said means for generating a zone number signal has a second operating mode in which said zone number signal continuously identifies the one of said virtual zones in which is situated the track being scanned at any time during the reproducing of information therefrom so that, if reproducing of information continues from tracks situated in a virtual zone adjacent said one virtual zone in which the reproducing was initiated, the resulting change in the generated zone number signal causes a corresponding change in said frequency of the clock signal.

21. An apparatus as in claim 20; further comprising means for selecting either the first mentioned operating mode or said second operating mode of said means for generating a zone number signal.

22. An apparatus as in claim 17; in which said means for generating a zone number signal continuously identifies the one of said virtual zones in which is situated the track being scanned at any time during the reproducing of information therefrom so that, if reproducing of information continues from tracks situated in a virtual zone adjacent said one virtual zone in which reproducing was initiated, the resulting change in the generated zone number signal causes a corresponding change in the frequency of the clock signal.

23. An apparatus as in claim 17; in which said means for generating a total zone number signal is operative to change said total number of virtual zones.

24. An apparatus as in claim 17; further comprising command input means for providing a command signal representing a selected region on said disk type recording medium from which said information is to be reproduced.

25. An apparatus as in claim 24; in which said command signal includes address data representative of an address on said disk type recording medium at which reproducing of said information is to be initiated and length data representative of the length of said information to be reproduced.

26. An apparatus as in claim 17; in which said disk type recording medium is an optical disk.

27. A method of processing data on a disk formatted in accordance with a constant linear velocity (CLV) system by means of apparatus having drive means for rotating said disk, head means movable in a radial direction relative to said disk for scanning radially successive substantially circular tracks on the disk, and circuit means connected with said head means and operable in response to a data transfer clock for causing said head means to selectively record or reproduce data in the tracks scanned thereby, said method comprising the steps of:

dividing said disk into a plurality of virtual zones arranged successively in said radial direction and each comprised of a respective plurality of said tracks;

determining the frequency of said data transfer clock during a recording or reproducing operation in dependence on the one of said virtual zones in which the tracks being scanned are situated at least during the initiation of said recording or reproducing operation, with said frequency determined at said initiation of the recording or reproducing operation being increased stepwise for each of the successive zones considered in the radially outward direction and being maintained substantially constant at least so long as the tracks being scanned are in the one of said zones at which said recording or reproducing operation was initiated; and establishing a predetermined angular velocity at which said drive means rotates said disk at said initiation of each said recording or reproducing operation and decreasing said angular velocity so long as successive tracks, considered in said radially outward direction, are scanned during said recording or reproducing operation in which said frequency of the data transfer clock is maintained substantially constant.

28. A method as in claim 27; in which said recording or reproducing operation continues during scanning of tracks in a virtual zone adjacent said one virtual zone, and in which, during the continued scanning of tracks in said adjacent virtual zone, said frequency of the data transfer clock is maintained unchanged at the frequency thereof determined for said initiation of the recording or reproducing operation in said one virtual zone.

29. A method as in claim 27; in which said recording or reproducing operation continues during scanning of tracks in a virtual zone adjacent said one virtual zone, and, during the continued scanning of tracks in said adjacent virtual zone, increasing said frequency of the data transfer clock in correspondence with said adjacent virtual zone.

30. A method as in claim 29; in which, upon said continued scanning of tracks in said adjacent virtual zone, said angular velocity at which the drive means rotates the disk is returned to said predetermined value and then is progressively decreased so long as successive tracks, considered in said radially outward direction, are scanned in said adjacent virtual zone.

31. A method of recording information on a disk type recording medium by an apparatus having drive means for rotating the recording medium, head means movable in a radial direction relative to said disk type recording medium for scanning radially successive substantially circular tracks on the recording medium, and recording circuit means connected with said head means and operable in response to a clock signal for causing said head means to record information in tracks then scanned thereby: said method comprising the steps of generating a total zone number signal representing a total number of virtual zones arranged successively in said radial direction and into which said disk type recording medium is virtually divided with each said virtual zone being comprised of a respective plurality of said tracks;

generating a track number signal representing the radial position, considered in a radially outward direction, of one of said tracks scanned by said head means for the recording of said information therein;

generating, on the basis of said track number signal and said total zone number signal, a zone number signal representing one of said virtual zones in which said one of the tracks is situated;

generating, on the basis of said track number signal, said zone number signal and said total zone number signal, a rotational speed reference signal representing a desired rotational speed of said disk type recording medium;

controlling said drive means in response to said rotational speed reference signal so as to rotate said disk type recording medium at a predetermined angular velocity when said head means scans a track at the radially inner periphery of each of said virtual zones and to decrease said angular velocity progressively from said predetermined angular velocity at least so long as successive scanned tracks, considered in said radially outward direction, are within the same one of said virtual zones; and generating said clock signal in response to said zone number signal and said total zone number signal so that the frequency of said clock signal is increased stepwise for each of the successive zones considered in said radially outward direction and is maintained substantially constant at least as long as the tracks being successively scanned are within the same one of said zones.

32. A method as in claim 31; in which said zone number signal is generated to identify only the one of said virtual zones in which said one of the tracks is situated at the initiation of the recording of said information so that, if recording of information continues on tracks situated in a virtual zone adjacent said one virtual zone, the generated zone number signal remains unchanged, and in response thereto, said clock signal is maintained at the frequency determined at said initiation of recording in said one virtual zone.

33. A method as in claim 32; in which, in response to said unchanged zone number signal generated when said recording of information continues on tracks situated in said adjacent virtual zone, said angular velocity is further progressively decreased.

34. A method as in claim 31; in which said zone number signal is generated so as to continuously identify the one of said virtual zones in which is situated the track being scanned at any time during the recording of information therein so that, if recording of information continues on tracks situated in a virtual zone adjacent said one virtual zone in which the recording was initiated, the resulting change in the generated zone number signal causes a corresponding change in the frequency of the clock signal.

35. A method of reproducing information recorded on a disk type recording medium formatted in accordance with a constant linear velocity system by means of an apparatus having drive means for rotating the recording medium, head means movable in a radial direction relative to said disk type recording medium for scanning radially successive substantially circular tracks on the recording medium, and reproducing circuit means connected with said head means and operable in response to a clock signal for reproducing information recorded in tracks then scanned by said head means: said method comprising the steps of generating a total zone number signal representing a total number of virtual zones arranged successively in said radial direction and into which said disk type recording medium is virtually divided with each said virtual zone being comprised of a respective plurality of said tracks;

generating a track number signal representing the radial position, counted in a radially outward direction, of one of said tracks scanned by said head means for reproducing of the information recorded therein;

generating, in response to said track number signal and said total zone number signal, a zone number signal representing one of said virtual zones in which said one of the tracks is situated;

generating, in response to said track number signal, said zone number signal and said total zone number signal, a rotational speed reference signal representing a desired rotational speed of said disk type recording medium and which causes said drive means to rotate said disk type recording medium at a predetermined angular velocity when said head means scans a track at the radially inner periphery of each of said virtual zones and to decrease said angular velocity progressively from said predetermined angular velocity at least so long as successive scanned tracks, considered in said radially outward direction, are within the same one of said virtual zones; and generating said clock signal in response to said zone number signal and total zone number signal so that the frequency of said clock signal is increased stepwise for each of the successive zones considered in said radially outward direction and is maintained substantially constant at least so long as the tracks being successively scanned are within the same one of said zones.

36. A method as in claim 35; in which said zone number signal is generated to identify only the one of said virtual zones in which said one of the tracks is situated at the initiation of the reproducing of said information so that, if reproducing of information continues from tracks situated in a virtual zone adjacent said one virtual zone, the generated zone number signal remains unchanged and, in response thereto, said clock signal is maintained at the frequency determined at said initiation of reproducing in said one virtual zone.

37. A method as in claim 36; in which, in response to said unchanged zone number signal generated when said reproducing of information continues from tracks situated in said adjacent virtual zone, said angular velocity is further progressively decreased.

38. A method as in claim 35; in which said zone number signal is generated so as to continuously identify the one of said virtual zones in which is situated the track being scanned at any time during the reproducing of information therefrom so that, if reproducing of information continues from tracks situated in a virtual zone adjacent said one virtual zone in which the reproducing was initiated, the resulting change in the generated zone number signal causes a corresponding change in the frequency of the clock signal.

* * * * *